(12) United States Patent
Berndaner et al.

(10) Patent No.: US 12,146,569 B2
(45) Date of Patent: Nov. 19, 2024

(54) MOTOR VEHICLE HAVING AN ELECTRONICALLY CONTROLLABLE PARKING LOCK AND HAVING AN ELECTRONICALLY CONTROLLABLE PARKING BRAKE

(71) Applicant: Bayerische Motoren Werke Aktiengesellschaft, Munich (DE)

(72) Inventors: Martin Berndaner, Ohlstadt (DE); Ulrich Hetzenecker, Herrsching (DE); Frederic Weber, Fahrenzhausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 536 days.

(21) Appl. No.: 17/423,954

(22) PCT Filed: Dec. 18, 2019

(86) PCT No.: PCT/EP2019/085933
§ 371 (c)(1),
(2) Date: Jul. 19, 2021

(87) PCT Pub. No.: WO2020/151887
PCT Pub. Date: Jul. 30, 2020

(65) Prior Publication Data
US 2022/0090679 A1 Mar. 24, 2022

(30) Foreign Application Priority Data
Jan. 22, 2019 (DE) .................. 10 2019 101 530.8

(51) Int. Cl.
*F16H 63/48* (2006.01)
*B60T 7/08* (2006.01)
(Continued)

(52) U.S. Cl.
CPC .............. *F16H 63/48* (2013.01); *B60T 7/085* (2013.01); *B60T 7/12* (2013.01); *B60T 8/17* (2013.01);
(Continued)

(58) Field of Classification Search
CPC ... B60T 7/085; B60T 7/12; B60T 8/17; B60T 13/74; B60T 2201/022; B60T 2201/06;
(Continued)

(56) References Cited

U.S. PATENT DOCUMENTS 6,256,568 B1 7/2001 Siepker et al.
2002/0066626 A1* 6/2002 Gill .................... B60T 7/107
188/158

(Continued)

FOREIGN PATENT DOCUMENTS

CN 106335487 A 1/2017
CN 108327726 A 7/2018
(Continued)

OTHER PUBLICATIONS

Chinese-language Office Action issued in Chinese Application No. 201980089795.9 dated Feb. 18, 2023 with English translation (nine (9) pages).
(Continued)

*Primary Examiner* — Joan T Goodbody
*Assistant Examiner* — Michael Lukon
(74) *Attorney, Agent, or Firm* — Crowell & Moring LLP

(57) ABSTRACT

A motor vehicle has an electronically controllable parking lock and an electronically controllable parking brake, which can be controlled individually or in combination. A device having an electronic control unit and a central operating element associated with the parking lock and the parking brake is provided. When the motor vehicle is at a standstill and the central operating element is actuated, the parking
(Continued)

lock and the parking brake can be controlled in a specific type of parking-lock and/or parking-brake activation. In a first specific type, during a first actuation of the central operating element, at least the parking brake is automatically activated first. If the central operating element is then re-actuated within a predefined time window, or if the central operating element remains actuated for a predefined minimum time period, the driver is offered at least one possibility of manually selecting a specific type of parking-lock and/or parking-brake activation.

7 Claims, 2 Drawing Sheets

(51) Int. Cl.
*B60T 7/12* (2006.01)
*B60T 8/17* (2006.01)
*B60T 13/74* (2006.01)
*F16D 123/00* (2012.01)

(52) U.S. Cl.
CPC ............ *B60T 13/74* (2013.01); *F16H 63/486* (2013.01); *B60T 2201/022* (2013.01); *B60T 2201/06* (2013.01); *F16D 2123/00* (2013.01)

(58) Field of Classification Search
CPC .......... B60T 1/005; B60T 1/062; B60T 7/122; B60T 13/66; B60T 13/662; F16D 2123/00; F16D 63/006; F16D 2121/24; F16H 59/60; F16H 59/64; F16H 2059/663; F16H 63/486; F16H 2059/666; F16H 63/48
See application file for complete search history.

(56) References Cited

U.S. PATENT DOCUMENTS

| | | | |
|---|---|---|---|
| 2003/0087727 A1 | 5/2003 | Loibl | |
| 2007/0213905 A1* | 9/2007 | Funk | B60W 30/1819 701/41 |
| 2010/0326787 A1* | 12/2010 | Giefer | B60T 7/085 192/220.2 |
| 2012/0006634 A1 | 1/2012 | Bensch et al. | |
| 2012/0232765 A1* | 9/2012 | Holub | B60R 25/08 701/66 |
| 2017/0080951 A1* | 3/2017 | Grossman | G06F 3/0488 |
| 2017/0182993 A1* | 6/2017 | Feldmann | B60T 17/22 |
| 2018/0201265 A1 | 7/2018 | Megyesi et al. | |
| 2018/0217592 A1 | 8/2018 | Ueno | |
| 2021/0039663 A1* | 2/2021 | Gohlke | B60W 50/10 |

FOREIGN PATENT DOCUMENTS

| | | | | |
|---|---|---|---|---|
| CN | 108372859 A | 8/2018 | | |
| DE | 198 31 733 A1 | 1/2000 | | |
| DE | 100 28 350 A1 | 12/2001 | | |
| DE | 103 51 589 A1 | 6/2005 | | |
| DE | 10 2004 047 100 B3 | 3/2006 | | |
| DE | 10 2004 047 102 B3 | 3/2006 | | |
| DE | 102005046278 A1 * | 4/2006 | ............. B60T 1/005 |
| DE | 10 2005 046 278 B4 | 4/2008 | | |
| DE | 10 2007 021 831 A1 | 11/2008 | | |
| DE | 102007036423 A1 * | 2/2009 | ............. B60T 7/085 |
| DE | 10 2008 064 077 A1 | 7/2010 | | |
| DE | 10 2013 009 747 A1 | 12/2014 | | |

OTHER PUBLICATIONS

International Search Report (PCT/ISA/210) issued in PCT Application No. PCT/EP2019/085933 dated Feb. 17, 2020 with English translation (four (4) pages).

German-language Written Opinion (PCT/ISA/237) issued in PCT Application No. PCT/EP/2019/085933 dated Feb. 17, 2020 (six (6) pages).

German-language Search Report issued in German Application No. 10 2019 101 530.8 dated Feb. 4, 2020 with partial English translation (11 pages).

* cited by examiner

MOTOR VEHICLE HAVING AN ELECTRONICALLY CONTROLLABLE PARKING LOCK AND HAVING AN ELECTRONICALLY CONTROLLABLE PARKING BRAKE

BACKGROUND AND SUMMARY OF THE INVENTION

The invention relates to a motor vehicle with an electronically controllable parking lock and with an electronically controllable parking brake, which can be controlled individually or in combination.

A motor vehicle with a parking lock is usually a motor vehicle with an electronically controlled automatic transmission, for example with a multi-step gearbox or with a continuously variable transmission (CVT), or a motor vehicle with a fully or partially automated manual transmission, each of which includes an electronically controllable parking lock. In general, a parking lock is understood to be a device by way of which the transmission output shaft can be locked to prevent rotation. In contrast, a holding brake or parking brake relates to a device by way of which at least one wheel of a motor vehicle can be locked to prevent rotation.

From DE 198 31 733 A1, a safety system is known in which the parking lock and the parking brake each step in for each other in the event of a fault.

From DE 10 2004 047 100 B3 if a condition exists for the activation of the parking lock, the parking brake can always be activated first before the activation of the parking lock.

Finally, from DE 10 2005 046 278 B4 a motor vehicle is known with an electronically controllable parking lock and with an electronically controllable parking brake, which are always automatically controllable individually or separately by way of a central control element depending on various defined conditions. When the central control element is operated, the parking lock and the parking brake do not always have to be activated simultaneously and together. If first conditions exist, they can be activated simultaneously and together. If second conditions exist, they can be activated together but on a time-shifted basis (e.g. first the parking brake then shortly afterwards the parking lock to prevent tensioning of the parking lock). If third conditions exist, only the parking lock and if fourth conditions exist only the parking brake may be activated.

The decision regarding the activation type is therefore not up to the driver but is made automatically.

The object of the invention is to provide a motor vehicle in which the coordination of the functions of the parking lock and the parking brake is further improved both to increase operating comfort and to increase component protection.

This object is achieved by the claimed invention.

In a motor vehicle according to embodiments of the invention with an electronically controllable parking lock and with an electronically controllable parking brake, these are controllable individually or in combination. For this purpose, a device is provided with at least one electronic control unit and with a central control element associated with both the parking lock and the parking brake. The device is designed in such a way that when the central control element is operated with the motor vehicle at a standstill, the parking lock and the parking brake can be activated in a particular type of parking lock and/or parking brake activation.

According to embodiments of the invention, with a first specified parking lock and/or parking brake activation type for a first operation of the central control element at least the parking brake is first activated automatically. If the central control element is then operated again within a predetermined comparatively short time window or if the central control element remains activated for a predetermined minimum period of time, the driver is offered at least an option for manually selecting a certain (possibly different) parking lock and/or parking brake activation type.

In addition or alternatively, at a defined location, which can be recognized, for example, by way of a navigation system, a location-dependent parking lock and/or parking brake activation type can be automatically set or predetermined for manual selection, wherein at least the parking brake is activated, not necessarily first. For example, it could be that when the home address is recognized, only the activation of the parking lock could be a location-dependent parking lock and/or parking brake activation type.

In a development of the invention, the offer of manual selection of a certain parking lock and/or parking brake activation type is prevented if at least one defined condition is detected, which indicates an increased risk of rolling away or collision. Such a condition may be, for example, a low outside temperature and/or a road gradient and/or a trailer operation and/or a short distance to an obstacle.

In a further embodiment of the invention, the deactivation of the parking brake in the case of previous activation of the parking lock can be specified as a manual selection option if, for example, freezing of the parking brake would be likely due a low outside temperature in the case of a longer parking time.

The simplification of operation for the driver is maintained, as only one control element still has to be operated for two systems. The decision regarding the type of activation can still be made automatically, but the driver is offered manual intervention options.

Preferably, the controls usually used for activating only the parking lock and for activating only the parking brake are omitted. Only a single central control element which can be freely placed is provided for the vehicle according to embodiments of the invention.

The invention is based on the following finding:

The parking lock and the parking brake are two components with the same or similar function, namely, to secure the vehicle against unwanted rolling away after stopping.

Usually, in vehicles with a parking lock and a parking brake, each of these systems is assigned its own control element. The two control elements are usually also labeled similarly in conjunction with the letter "P". This can lead to confusion for the driver of the vehicle. Also, multiple control elements must be operated to activate or deactivate the parking lock and the parking brake.

Embodiments of the invention conceptually combine the functions of the parking lock and the parking brake in a "park vehicle safely" function and assign only a single central control element to this function.

The term electronically controlled automatic transmission is intended to mean any type of electronically controlled automatic transmission, for example with a multi-step transmission or with a continuously variable transmission (CVT), as well as all fully or partially automated manual transmissions and also transmissions of electric vehicles with a parking lock.

The current state of the art in known production vehicles is that when parking the vehicle on a slope and when engaging the gear or the gear selection "P", the electric parking brake (EPB) is automatically applied in addition to the transmission lock. As a result, the actual gear of the automatic transmission is reacted to in order to improve the comfort and the feeling of safety of the transmission lock, which is realized by a detent in the transmission, with the help of the EPB. However, the driver is not able to adapt this process individually to his needs and the gear "P" can be engaged on a slope, although the vehicle is not held securely by the hydraulic service brake. In addition, to date there are two different control elements for the EPB and the transmission lock.

Since an EPB can fail without electric current or in the event of malfunctions, a parking lock is usually also available as redundancy to secure the vehicle. In addition, the parking lock is of enormous importance in terms of theft protection.

According to embodiments of the invention, a single intelligent control element "P" for the "park vehicle safely" function is described, which applies the mechanical transmission parking lock, optionally builds up hydraulic pressure on the service brake and/or pulls in the electric parking brake (EPB). The control element is preferably designed in the form of a button and can be freely placed in the vehicle interior. This parking button is connected directly to the control unit for the EPB function in order to detect the driver's request and to be able to react in a targeted manner.

On the hardware side, the idea is preferably implemented by electronic connection of the three systems already at least individually present in production vehicles (EPB, mechanical transmission parking lock, service brake) and their actuators and is coordinated by a central intelligence (by way of a suitably programmed electronic control unit). As a software-side standard function it is implemented according to embodiments of the invention that the vehicle is held by the hydraulic service brake until the transmission lock is applied and/or the EPB is pulled in. This leads to the result that no rolling of the vehicle will occur until the holding effect has been built up.

The complexity of the invention arises mainly from the large number of different applications, which are defined by the individual or joint control of the two safety systems based on various parameters. On the one hand, depending on the environmental conditions, the vehicle can independently decide which actuators are controlled by pressing the parking button, and on the other hand, the customer is enabled to individually configure the systems controlled by the parking button.

In the following, examples of the environmental conditions influencing the invention and their implications for the control of the actuators are given:

Condition: PDC or reversing camera detects a nearby obstacle.

Consequence: Transmission parking lock and EPB are both activated to fix the vehicle at a point, since the transmission lock allows rolling forward and backward over a small range and does not prevent driving up to a nearby obstacle.

Condition: Weather forecast predicts extremely cold or wet weather or by querying a country variant (a certain location) and a country with very cold/wet weather is recognized according to experience.

Consequence: EPB is not permanently activated for parking, as bad weather leads to increased wear and it can rust, especially during long parking periods.

Condition: Vehicle is often parked in the same or similar places (location recognition).

Consequence: Depending on the analysis of the parking situation by the vehicle and by self-learning, adaptation of the "park vehicle safely" function with the aim of deciding for safety and comfort reasons what is currently the best way to prevent the vehicle from rolling away. For this purpose, the typical parking behavior of the driver and his usage behavior in relation to the parking button (for example frequent manual selection of a parking lock and/or parking brake activation type) can be analyzed (e.g. frequency of use of the central control element (parcel service, service worker with constant home visits), use at red lights, etc.). Thereafter, automatic adjustment of the parking lock and/or parking brake activation type depending on the previously learned manual selection for fixing the vehicle for optimal comfort and safety in certain situations or in certain places is possible.

In addition, a particularly advantageous component of the invention is that by way of a human-machine interface (for example by way of a conventional display control unit) the driver can individually configure the defined parking lock and/or parking brake activation type depending on the operation of the central control element and, if necessary, depending on other conditions. For example, he can arrange for the vehicle to always be parked with the EPB at his workplace and always without the EPB at home. If this configuration was carried out once, the simple operation of the central control element is sufficient to cover these applications. For special situations (for example a homologation test or completely different customer requirements), it is preferably also possible to activate or release the EPB manually by "soft key".

All consequences dependent on a condition can be controlled automatically or offered to the driver as an option for manual selection, especially if the central control element is operated in a predetermined form—i.e.

in the case of a second operation of the central control element within a specified comparatively short time window or in the case of a first operation of the central control element for a specified minimum duration.

Embodiments of the invention bring in particular the following advantages: combination of the "park vehicle safely" function including all actuators to be controlled in a single central control element, for example the "parking button".

Adaptation of the control of transmission lock or EPB to environmental conditions and implementation of an intelligent, self-learning algorithm.

Individual configuration of the system. Continuous availability of the system.

No rolling of the vehicle until the holding effect of the detent or EPB has built up.

The invention is described in more detail below using an exemplary embodiment and with reference to the enclosed drawings.

DETAILED DESCRIPTION OF THE DRAWINGS

Figure 1:
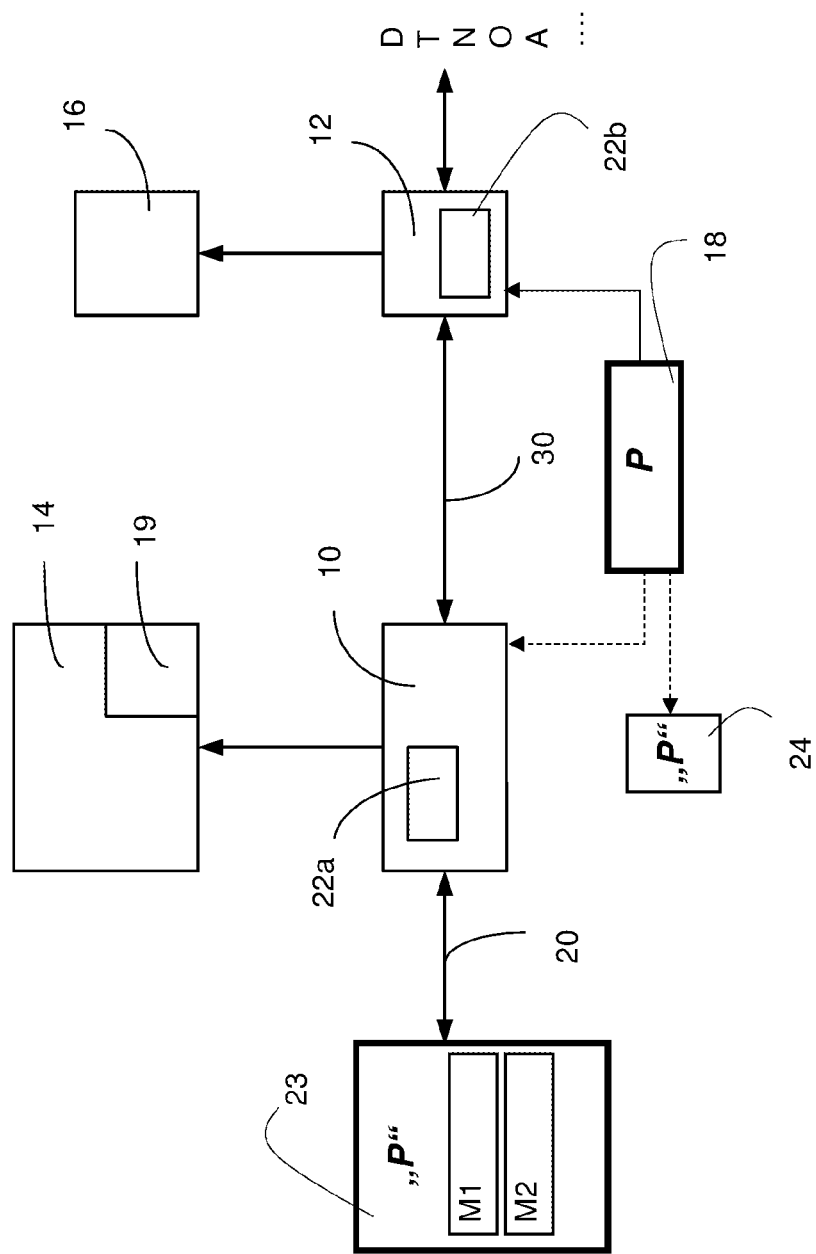
FIG. 1 shows a schematic sketch of connected components of the electronically controlled automatic transmission and the parking brake.

According to FIG. 1, an automatic transmission 14 is provided in a vehicle, which is not shown in detail here, which is controlled by an electronic control unit 10 according to predetermined signals transmitted via a data bus 20 and according to a predetermined transmission algorithm. The automatic transmission 14 comprises an electronically controllable parking lock 19, which can be controlled by way of the control unit 10 depending on its input signals.

Furthermore, an electromechanical parking brake ("EPB") 16 is provided, which is controlled by a brake control unit 12.

As represented with the data bus line 30, the transmission control unit 10 and the brake control unit 12 are connected to each other.

The at least one control unit of the device according to embodiments of the invention, which is designed such that on operating a central control element 18, both the parking lock 19 and the parking brake 16 can be activated, can be integrated either in the transmission control unit 10 or in the brake control unit 12, or as here, in both control units as interacting (partial) control units 22*a* and 22*b*. The only signal information of the central control element 18 assigned to both the parking lock 19 and the parking brake 16 is passed here, for example, to the brake control unit 12 and optionally to the transmission control unit 10. If the signal information of the central control element 18 is "switch on", the parking lock 19 and/or the parking brake 16 is/are activated according to the following rules according to embodiments of the invention by way of the transmission control unit 10, the connecting line 30 and the brake unit 12 in the presence of defined conditions:

As a first specific parking lock and/or parking brake activation type, for a first operation of the central control element 18 at least the parking brake 16 is initially activated. After that, the driver is offered:

for a second operation of the central control element 18 within a predetermined comparatively short time window, or for a first operation of the central control element 18 for a predetermined minimum duration, for example via a display control unit 23, at least one option M1 and/or M2 for manually selecting a certain (possibly different) parking lock and/or parking brake activation type to activate the "P" function for "park vehicle safely".

Figure 2:
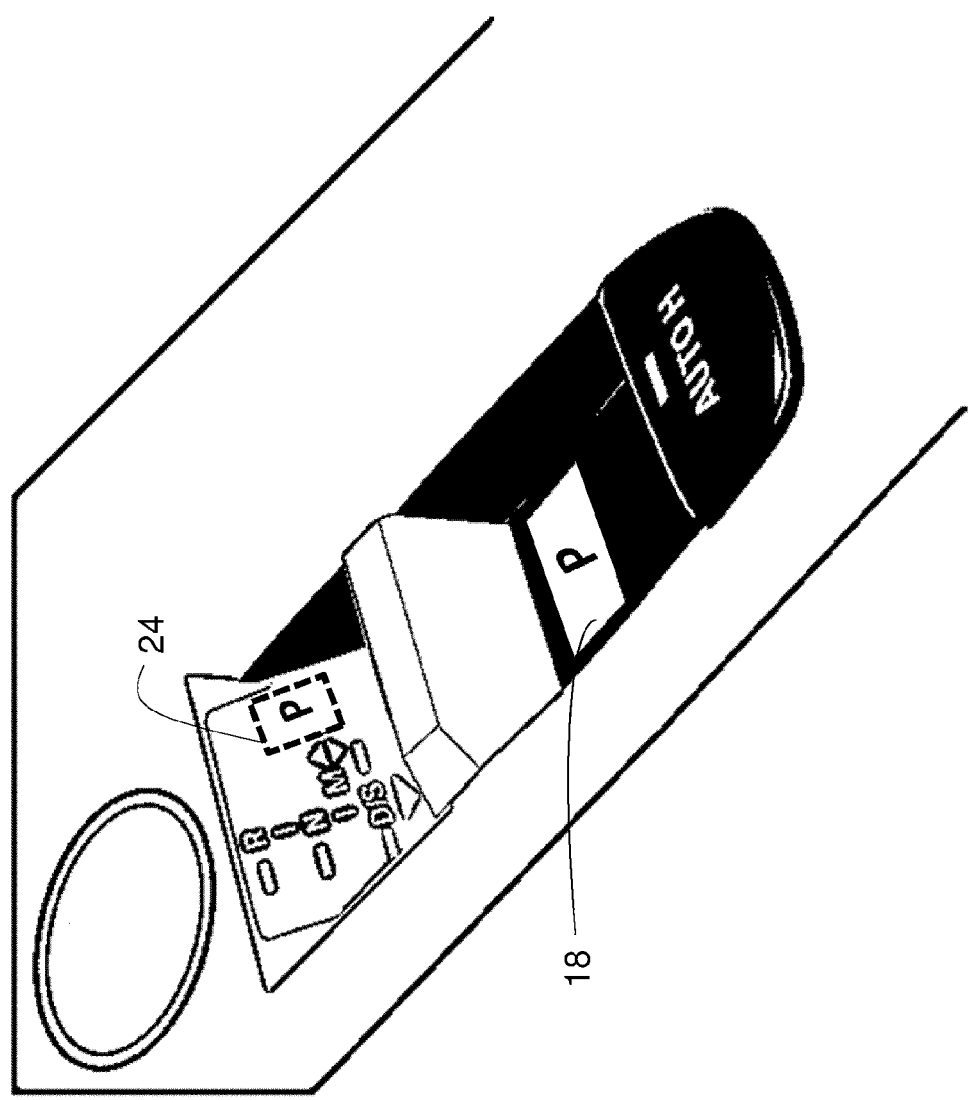
FIG. 2 shows a possible embodiment of the central control element in combination with the operation of an automatic transmission and a display of the activation status in the case of "park vehicle safely".

The activation status of the "P" function for "Park vehicle safely" can be displayed in a display of the display control element 23 or in a display 24 next to the central control element 18, see here the button in the center console according to FIG. 2.

In an advantageous embodiment of the invention, the offer of manual selection of a particular parking lock and/or parking brake activation type can be prevented if at least one defined condition is detected, which indicates an increased risk of rolling away or collision. One such condition may be, for example, a low outside temperature T and/or a road gradient N and/or a trailer operation A and/or a short distance D to an obstacle. A low outside temperature can be detected if a detected outside temperature T is lower than a predetermined threshold indicating reduced road friction. However, a low outside temperature can also be detected in the broadest sense if the presence of a certain place O (also in the form of a cold country) is detected. A short distance D can be detected by the usual PDC sensors. However, a short distance can also be assumed to be location-based if the vehicle is in a duplex garage, on a ferry or in another loading situation, for example. For the detection of road gradient N, inclination sensors in vehicles are already known. Trailer operation A can be detected for example by evaluating the trailer plug signals or the position of the trailer coupling.

In particular, a manual selection option M1 may be the deactivation of the parking brake 16 with previous activation of the parking lock 19.

In a further advantageous embodiment of the invention, a manual selection option M2 may be the setting of a parking lock and/or parking brake activation type at a defined location O, wherein even for a first operation of the central control element 18 in recognition of a defined location O, a parking lock and/or parking brake activation type specified for this location can be activated, in which at least the parking brake 16 is activated, not necessarily first. For example, when recognizing the home address or another recurring location O only the activation of the parking lock 19 could always be a location-dependent parking lock and/or parking brake activation type, in particular if the control unit 22 (22*a* and/or 22*b*) has learned that only the parking lock 19 has always previously been manually selected when in this particular location O.

The location-dependent parking lock and/or parking brake activation type can thus either be activated automatically for the first operation of the central control element 18 or can be offered as a manual selection M2 after a first operation of the central control element 18, i.e.

for a second operation of the central control element 18 within a predetermined comparatively short time window, or for a first operation of the central control element 18 for a predetermined minimum duration.

With embodiments of the aforementioned invention, a high level of vehicle safety and individual parking functionality are ensured in a simple and cost-effective manner.

What is claimed is:
1. A motor vehicle comprising:
an electronically controllable parking lock and an electronically controllable parking brake, wherein the parking lock and the parking brake are controlled individually or in combination;
a device comprising at least one electronic control unit and a central control element associated with both the parking lock and the parking brake, wherein the device is configured such that when the central control element is operated with the motor vehicle at a standstill, the parking lock and the parking brake are able to be activated individually or in combination as a particular type of at least one of a parking lock activation or a parking brake activation; and
a display control unit to display selectable options for manually configuring a specified type of at least one of a parking lock activation or a parking brake activation,
wherein, after a first operation of the central control element, at least the parking brake is activated, and wherein;
after a second operation of the central control element within a predetermined time window from the first operation of the central control element, the display control unit displays first and second selectable options for manually configuring the specified type of at least one of the parking lock activation or the parking brake activation, or
after the first operation of the central control element for a predetermined minimum duration, the display control unit displays the first and the second selectable options for manually configuring the specified type of at least one of the parking lock activation or the parking brake activation.

2. The motor vehicle according to claim 1, wherein an offer of manual selection of at least one of a certain parking lock activation type or a certain parking brake activation type is prevented if at least one defined condition is detected which indicates an increased risk of rolling away or collision.

3. The motor vehicle according to claim 1, wherein deactivation of the parking brake with previous activation of the parking lock is selectable as a manual selection option.

4. The motor vehicle according to claim 1, wherein setting at least one of a parking lock activation type or a parking brake activation type at a defined location is selectable as a manual selection option.

5. A motor vehicle comprising:
an electronically controllable parking lock and an electronically controllable parking brake, wherein the parking lock and the parking brake are controllable individually or in combination;
a device comprising at least one control unit and a central control element associated with both the parking lock and the parking brake, wherein the device is configured such that when the central control element is operated with the motor vehicle at a standstill, the parking lock and the parking brake are able to be activated individually or in combination; and
a display control unit to display selectable options for manually configuring a specified type of at least one of a parking lock activation or a parking brake activation,
wherein, after a first operation of the central control element and after detection of a defined location, at least one of a parking lock activation type or a parking brake activation type specified for the defined location is activated based on previous operations of the central control element by a driver at the defined location, and wherein:
after a second operation of the central control element within a predetermined time window from the first operation of the central control element, the display control unit displays first and second selectable options for manually configuring the specified type of at least one of the parking lock activation or the parking brake activation, or
after the first operation of the central control element for a predetermined minimum duration, the display control unit displays the first and the second selectable options for manually configuring the specified type of at least one of the parking lock activation or the parking brake activation.

6. The motor vehicle according to claim 5, wherein the parking brake is activated first.

7. The motor vehicle according to claim 5, wherein the parking lock is activated first.

* * * * *